US006956951B2

(12) United States Patent
Shimoyama et al.

(10) Patent No.: US 6,956,951 B2
(45) Date of Patent: Oct. 18, 2005

(54) EXTENDED KEY PREPARING APPARATUS, EXTENDED KEY PREPARING METHOD, RECORDING MEDIUM AND COMPUTER PROGRAM

(75) Inventors: Takeshi Shimoyama, Kawasaki (JP); Koichi Ito, Kawasaki (JP); Masahiko Takenaka, Kawasaki (JP); Naoya Torii, Kawasaki (JP); Jun Yajima, Kawasaki (JP); Hitoshi Yanami, Kawasaki (JP); Kazuhiro Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 830 days.

(21) Appl. No.: 09/811,551

(22) Filed: Mar. 20, 2001

(65) Prior Publication Data

US 2002/0006196 A1 Jan. 17, 2002

(30) Foreign Application Priority Data

Jul. 13, 2000 (JP) .................................... 2000-212482

(51) Int. Cl.[7] ................................................ H04L 9/00
(52) U.S. Cl. ........................................ 380/277; 380/46
(58) Field of Search .......................... 380/277, 46, 42, 380/29

(56) References Cited

U.S. PATENT DOCUMENTS 5,511,123 A * 4/1996 Adams ........................ 380/29
6,570,989 B1 * 5/2003 Ohmori et al. ............... 380/42

FOREIGN PATENT DOCUMENTS

EP 1001398 A1 * 5/2000 ........... G09C/1/00

OTHER PUBLICATIONS

Vanstone et al. "Handbook of Applied Cryptography", Chapter 7, pp. 223–282, 1997.*

Menezes et al., "Handbook of Applied Cryptography", Chapter 7, pp. 223–282, 1997.

Ferguson et al., "Cryptanalysis of Akelarre", Cryptanalysis of Akelarre23 Jul. 1997, pp. 1–12.

Carolynn Burwick et al. "MARS–a candidate cipher for AES", IBM Corporation. Aug. 20–22, 1998. pp. 1–10.

Daemen et al., "AES Proposal: Rjindael", The Rjindael Block Cipher, pp. 1–45, Sep. 3, 1999.

* cited by examiner

*Primary Examiner*—Matthew Smithers
*Assistant Examiner*—Courtney Fields
(74) *Attorney, Agent, or Firm*—Staas & Halsey LLP

(57) ABSTRACT

Intermediate data $a_i$, $b_i$, $c_i$, and $d_i$ are prepared by an intermediate data preparing equipment 4 from a cryptographic key through a nonlinear type function operation and the like, an extended key preparing equipment 5 selects a $[X_r]$, b $[Y_r]$, c $[Z_r]$, and d $[W_r]$ corresponding to the number of stages r from the intermediate data, and rearranges the data as well as conducts that of bit operation to prepare extended keys, whereby an extended key preparing apparatus by which an extended key required in the case where common key cryptosystem is applied can be safely prepared at a high speed, a process for preparing such an extended key, and a recording medium used therefor are provided.

22 Claims, 8 Drawing Sheets

FIG.5

(a) $x_r = z_r = r \bmod 3, \quad y_r = w_r = r + [r/3] \bmod 3$ · · · EQUATION (1)

(b)

CIRCULATING WITH 9 ELEMENTS

| | | | | | | | | | | | |
|---|---|---|---|---|---|---|---|---|---|---|---|
| r | 0 | 1 | 2 | 3 | 4 | 5 | 6 | 7 | 8 | 9 | 0 · · · |
| Xr | 0 | 1 | 2 | 0 | 1 | 2 | 0 | 1 | 2 | 0 | 1 · · · |
| Yr | 0 | 1 | 2 | 1 | 2 | 0 | 2 | 0 | 1 | 0 | 1 · · · |
| Zr | 0 | 1 | 2 | 0 | 1 | 2 | 0 | 1 | 2 | 0 | 1 · · · |
| Wr | 0 | 1 | 2 | 1 | 2 | 0 | 2 | 0 | 1 | 0 | 1 · · · |

(c) ORDER TABLE

| r (-TH STAGE) | ORDER_12(X,Y,Z,W,r) ← REARRANGEMENT |
|---|---|
| 0 | (X,Y,Z,W) |
| 1 | (Y,X,W,Z) |
| 2 | (Z,W,X,Y) |
| 3 | (W,Z,Y,X) |
| 4 | (X,Z,W,Y) |
| 5 | (Y,W,Z,X) |
| 6 | (Z,X,Y,W) |
| 7 | (W,Y,X,Z) |
| 8 | (X,W,Y,Z) |
| 9 | (Y,Z,X,W) |
| 10 | (Z,Y,W,X) |
| 11 | (W,X,Z,Y) |

(a)

(b) S5(x)

| x | S5(x) | x | S5(x) | x | S5(x) | x | S5(x) |
|---|---|---|---|---|---|---|---|
| 0 | 20 | 8 | 22 | 16 | 27 | 24 | 23 |
| 1 | 26 | 9 | 30 | 17 | 11 | 25 | 5 |
| 2 | 7 | 10 | 13 | 18 | 1 | 26 | 8 |
| 3 | 31 | 11 | 14 | 19 | 21 | 27 | 3 |
| 4 | 19 | 12 | 4 | 20 | 6 | 28 | 0 |
| 5 | 12 | 13 | 24 | 21 | 16 | 29 | 17 |
| 6 | 10 | 14 | 9 | 22 | 2 | 30 | 29 |
| 7 | 15 | 15 | 18 | 23 | 28 | 31 | 25 |

(c) S6(x)

| x | S6(x) | x | S6(x) | x | S6(x) | x | S6(x) |
|---|---|---|---|---|---|---|---|
| 0 | 47 | 16 | 37 | 32 | 62 | 48 | 3 |
| 1 | 59 | 17 | 63 | 33 | 52 | 49 | 16 |
| 2 | 25 | 18 | 20 | 34 | 35 | 50 | 41 |
| 3 | 42 | 19 | 61 | 35 | 18 | 51 | 34 |
| 4 | 15 | 20 | 55 | 36 | 14 | 52 | 33 |
| 5 | 23 | 21 | 2 | 37 | 46 | 53 | 7 |
| 6 | 28 | 22 | 30 | 38 | 0 | 54 | 45 |
| 7 | 39 | 23 | 44 | 39 | 54 | 55 | 49 |
| 8 | 26 | 24 | 9 | 40 | 17 | 56 | 50 |
| 9 | 38 | 25 | 10 | 41 | 40 | 57 | 58 |
| 10 | 36 | 26 | 6 | 42 | 27 | 58 | 1 |
| 11 | 19 | 27 | 22 | 43 | 4 | 59 | 21 |
| 12 | 60 | 28 | 53 | 44 | 31 | 60 | 43 |
| 13 | 24 | 29 | 48 | 45 | 8 | 61 | 57 |
| 14 | 29 | 30 | 51 | 46 | 5 | 62 | 32 |
| 15 | 56 | 31 | 11 | 47 | 12 | 63 | 18 |

-TH bit (d)

| x | MDS(x) | x | MDS(x) |
|---|---|---|---|
| 0 | 0x41491a0c | 16 | 0x1cbdbd5f |
| 1 | 0x06b23c18 | 17 | 0xbd5b72de |
| 2 | 0xc82d625d | 18 | 0xe20b5083 |
| 3 | 0x905ac49b | 19 | 0x4437a947 |
| 4 | 0xa0b48936 | 20 | 0x0c4e5aaf |
| 5 | 0xdc270c74 | 21 | 0x3ee876c7 |
| 6 | 0x92d79994 | 22 | 0x7dd0edaf |
| 7 | 0x218e3349 | 23 | 0xc549adf8 |
| 8 | 0x51caf706 | 24 | 0x8eb25b91 |
| 9 | 0xa7b5e64d | 25 | 0x9d64bf43 |
| 10 | 0x4b6bccda | 26 | 0x9bf8b70f |
| 11 | 0x21c7690a | 27 | 0x37d1665f |
| 12 | 0xa3afd215 | 28 | 0x707b73f1 |
| 13 | 0xa6b8cd01 | 29 | 0x64f6efc3 |
| 14 | 0xc9719a42 | 30 | 0xcdecdfa7 |
| 15 | 0x92e334a5 | 31 | 0xf745e823 |

(e)

EXTENDED KEY PREPARING APPARATUS, EXTENDED KEY PREPARING METHOD, RECORDING MEDIUM AND COMPUTER PROGRAM

FIELD OF THE INVENTION

The present invention relates to an extended key preparing apparatus and method as well as to a recording medium and computer program, and particularly to an extended key preparing apparatus by which an extended key required in the case where common key cryptosystem is applied can be safely prepared at a high speed, a process for preparing such an extended key, and a recording medium and computer program used therefor.

BACKGROUND OF THE INVENTION

Common key cryptosystem wherein a cryptographic key being commonly used in both transmission and reception sides has been heretofore known. FIG. 8 is an explanatory view for explaining cryptographic processing in accordance with usual common key cryptograph. As shown in FIG. 8, the cryptographic equipment is composed of an extended key preparing means for preparing an extended key for cryptographic key, and a cryptographic processing means for encrypting a plaintext by the use of such extended key.

More specifically, since n-stages of cryptographic processing, i.e., cryptographic processing 1 to cryptographic processing n are implemented in the cryptographic processing equipment, extended key 1 to extended key n necessary for the n-stages of cryptographic processing are successively prepared in the extended key preparing means.

Accordingly, it is a very important problem in that a safe extended key is how rapidly prepared by the extended key preparing means in case of adopting common key cryptosystem.

In this connection, according to DES (Data Encryption Standard) cryptograph, extended keys 1 to n are prepared from a cryptographic key by means of only cyclical shifting and bit transposition, whereby a preparation of extended keys is realized at a high speed as shown in FIG. 9.

Furthermore, a process for preparing extended keys by means of MARS has been known as a process for preparing safer extended keys (a candidate cipher for AES, The First AES Conference, 1998, pages 1–9).

According to the above described DES cryptograph, however, an extended key is prepared by only cyclical shifting and bit transposition as shown by a mark ※ in FIG. 9, so that there are problems in view of safety. More specifically, even if information has been leaked as to one key among the number n of extended keys prepared by extended key preparing equipment, a cryptographic key itself to be input to extended key preparing equipment becomes clear in this DES cryptosystem, whereby problems of safety arise.

On the other hand, according to the above described MARS extended key preparing apparatus, information of a cryptographic key cannot be easily acquired from information of an extended key, so that there is no problem as to safety like in DES cryptosystem. However, another problem in such that many calculations must be repeated in the process, whereby the operations require much time arises.

From the matters described above, it has been a very important problem that a safe extended key required in case of applying common key cryptosystem is how rapidly prepared.

SUMMARY OF THE INVENTION

It is an object of the present invention to provide an extended key preparing apparatus by which an extended key required in the case where common key cryptosystem is applied can be safely prepared at a high speed, a process for preparing such an extended key, and a recording medium used therefor.

An extended key preparing apparatus of a first aspect wherein extended keys are prepared in common key cryptosystem from a cryptographic key input, comprises a dividing means for dividing binary digit string of the cryptographic key into a plurality of elements each composed of a predetermined bit length (corresponding to the intermediate data preparing means 4 of FIG. 1); an intermediate data preparing means for preparing a plurality of intermediate data by applying a plurality of times an operation wherein a predetermined constant is used to the respective elements divided by the dividing means (corresponding to the intermediate data preparing means 4 of FIG. 1); a selecting means for selecting a plurality of intermediate data corresponding to the number of stages of extended keys from the plurality of the intermediate data prepared by the intermediate data preparing means (corresponding to the extended key preparing means 5 of FIG. 1); and an extended key preparing means for preparing the extended keys corresponding to the number of stages by converting irreversibly the plurality of the intermediate data selected by the selecting means (corresponding to the extended key preparing means 5 of FIG. 1).

According to the invention of the first aspect, binary digit string of the cryptographic key is divided into a plurality of elements each composed of a predetermined bit length; a plurality of intermediate data are prepared by applying the plurality of times an operation wherein a predetermined constant is used to the respective elements; a plurality of intermediate data corresponding to the number of stages of extended keys are selected from the plurality of the intermediate data prepared; and the extended keys corresponding to the number of stages are prepared by converting irreversibly the plurality of the intermediate data selected, whereby such extended keys required in the case where common key cryptosystem is applied can be safely prepared at a high speed.

Furthermore, an extended key preparing method of a eleventh aspect wherein extended keys are prepared in common key cryptosystem from a cryptographic key input, comprises a dividing step for dividing binary digit string of the cryptographic key into a plurality of elements each composed of a predetermined bit length; an intermediate data preparing step for preparing a plurality of intermediate data by applying the plurality of times an operation wherein a predetermined constant is used to the respective elements divided by the dividing step; a selecting step for selecting a plurality of intermediate data corresponding to the number of stages of extended keys from the plurality of the intermediate data prepared by the intermediate data preparing step; and an extended key preparing step for preparing the extended keys corresponding to the number of stages by converting irreversibly the plurality of the intermediate data selected by the selecting step.

According to the invention of the eleventh aspect, binary digit string of the cryptographic key is divided into a plurality of elements each composed of a predetermined bit length; a plurality of intermediate data are prepared by applying the plurality of times an operation wherein a predetermined constant is used to the respective elements; a plurality of intermediate data corresponding to the number of stages of extended keys are selected from the plurality of the intermediate data prepared; and the extended keys corresponding to the number of stages are prepared by converting irreversibly the plurality of the intermediate data selected, whereby such extended keys required in the case where common key cryptosystem is applied can be safely prepared at a high speed.

Furthermore, a computer readable recording medium and computer program of a twenty-first aspect wherein an extended key preparing program in which extended keys are prepared in common key cryptosystem from a cryptographic key input is to be recorded, comprises recording the program containing a dividing step for dividing binary digit string of the cryptographic key into a plurality of elements each composed of a predetermined bit length; an intermediate data preparing step for preparing a plurality of intermediate data by applying the plurality of times an operation wherein a predetermined constant is used to the respective elements divided by the dividing step; a selecting step for selecting a plurality of intermediate data corresponding to the number of stages of extended keys from the plurality of the intermediate data prepared by the intermediate data preparing step; and an extended key preparing step for preparing the extended keys corresponding to the number of stages by converting irreversibly the plurality of the intermediate data selected by the selecting step.

According to the invention of the twenty-first aspect, binary digit string of the cryptographic key is divided into a plurality of elements each composed of a predetermined bit length; a plurality of intermediate data are prepared by applying the plurality of times an operation wherein a predetermined constant is used to the respective elements; a plurality of intermediate data corresponding to the number of stages of extended keys are selected from the plurality of the intermediate data prepared; and the extended keys corresponding to the number of stages are prepared by converting irreversibly the plurality of the intermediate data selected, whereby such extended keys required in the case where common key cryptosystem is applied can be safely prepared at a high speed.

Other objects and features of this invention will become apparent from the following description with reference to the accompanying drawings.

BRIEF DESCRIPTION OF THE DRAWINGS

FIGS. 5(*a*), 5(*b*), and 5(*c*) are explanatory diagrams each for explaining selection of data by means of the selected value deciding equipment as well as rearrangement of data by means of the data rearrangement processing equipment shown in FIGS. 4(*a*) and 4(*b*);

DESCRIPTION OF THE PREFERRED EMBODIMENT

A preferred embodiment applied suitably for an extended key preparing apparatus, an extended key preparing method, and a recording medium according to the present invention will be described in detail hereinafter by referring to the accompanying drawings.

Figure 1:
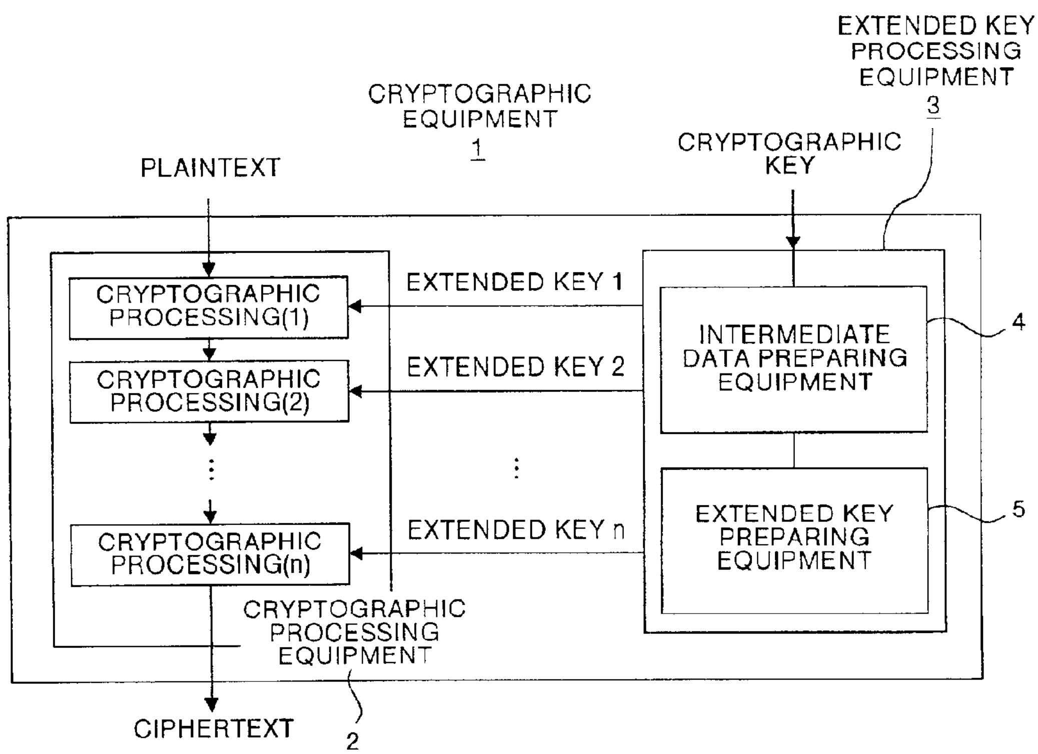
FIG. 1 is a block diagram showing the whole construction of cryptographic equipment used in the present embodiment.

First, the whole construction of cryptographic equipment used in the present embodiment will be described. FIG. 1 is a block diagram illustrating the whole construction of the cryptographic equipment 1 used in the present embodiment. As shown in FIG. 1 the cryptographic equipment 1 is the one which prepares an extended key 1 to an extended key n from a cryptographic key in the case when a plaintext or the cryptographic key is input, and encrypts the plaintext by the use of the extended keys 1 to n prepared.

The cryptographic equipment 1 involves cryptographic processing equipment 2 for effecting cryptographic processing of a plaintext, and an extended key processing equipment 3 for preparing extended keys 1 to n required for encryption in the cryptographic processing equipment 2.

The cryptographic processing equipment 2 performs cryptographic processing (1) to (n) of n-stages by the use of the extended keys 1 to n to prepare a ciphertext corresponding to the plaintext, and the resulting ciphertext is output. In the cryptographic processing of n-stages (1) to (n), each cryptographic processing is carried out after receiving the extended keys 1 to n prepared in the extended key processing equipment 3, and the ciphertext is output from the final stage wherein the cryptographic processing (n) is carried out.

The extended key processing equipment 3 is the one for preparing the extended keys 1 to n, which are to be supplied to the cryptographic processing equipment 2 from a cryptographic key which has been input, and which is provided with intermediate data preparing equipment 4 and an extended key preparing equipment 5. It is to be noted that the present embodiment of the invention is characterized in that an extended key is prepared by such a manner that an intermediate data is once prepared by means of the intermediate data preparing equipment 4, and then the extended key is prepared by the use of the intermediate data thus prepared, unlike a conventional manner wherein an extended key is prepared simply from a cryptographic key.

The intermediate data preparing equipment 4 is a processing section for preparing intermediate data composed of respective elements of $a_i$, $b_i$, $c_i$, and $d_i$ (i=0, 1, and 2) at the time when a cryptographic key is input. In the present embodiment, an explanation is made on the case where intermediate data $a_0$ to $a_2$, $b_0$ to $b_2$, $c_0$ to $c_2$, and $d_0$ to $d_2$ are prepared in case of "i=0, 1, and 2" for the convenience of explanation. While the detailed explanation will be made later, intermediate data are prepared by means of nonlinear type function, exclusive OR, addition, and multiplication in the intermediate data preparing equipment 4.

The extended key preparing equipment 5 is a processing section for preparing extended keys of the number corresponding to the specified number r of stages from the intermediate data which have been prepared by the intermediate data preparing equipment 4. More specifically, one each of elements (for example, $a_1$, $b_0$, $c_1$, and $d_2$) is selected from the respective elements $a_0$ to $a_2$, $b_0$ to $b_2$, $c_0$ to $c_2$, and $d_0$ to $d_2$, the respective elements thus selected are rearranged, for example, in such that $b_0$, $a_1$, $d_2$, and $c_1$, and a predetermined calculation is made on the rearranged elements to prepare the extended keys 1 to n.

Next, processing steps for preparing extended keys from a cryptographic key by means of the extended key processing equipment 3 shown in FIG. 1 will be described hereinafter. In this connection, FIG. 2 is a flowchart showing processing steps for preparing extended keys from a cryptographic key by the use of the extended key processing equipment 3 shown in FIG. 1.

Figure 2:
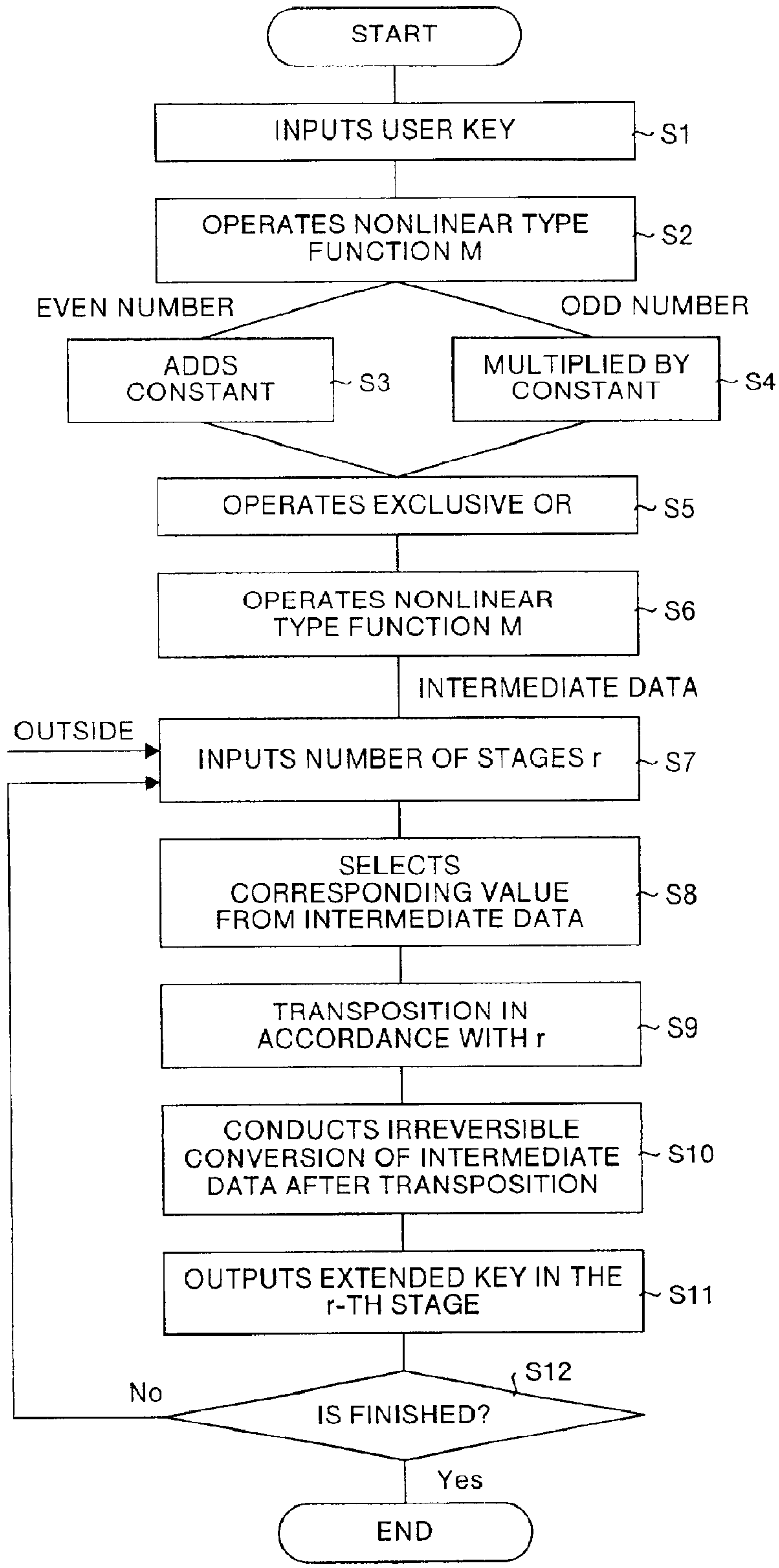
FIG. 2 is a flowchart illustrating processing steps for preparing an extended key from a cryptographic key by means of the extended key processing equipment shown in FIG. 1.

As shown in FIG. 2, when a plaintext is input together with a cryptographic key (user key) by a user (step S1), the cryptographic key is incorporated into the intermediate preparing equipment 4.

Thereafter, the intermediate processing equipment 4 divides binary digit strings of the cryptographic key into data $k_0$ to $k_7$ of eight groups, and an operation wherein the undermentioned nonlinear type function M is applied is made upon these data $k_0$ to $k_7$ to acquire data $k_0'$ to $k_7'$ (step S2).

Then, a constant is added to each of even number-th data $k_0'$, $k_2'$, $k_4'$, and $k_6'$ (step S3), while odd number-th data $k_1'$, $k_3'$, $k_5'$, and $k_7'$ are multiplied by the constant (step S4), thereafter exclusive OR operation is implemented with respect to the even number-th data to each of which was added the constant as well as to the odd number-th data with each of which is multiplied by the constant (step S5), and then, a nonlinear type function M is applied to the results operated (step S6), whereby intermediate data $a_i$ to $d_i$ are prepared. In this case, however, since the i takes values of 0, 1, and 2, intermediate data $a_0$ to $a_2$, $b_0$ to $b_2$, $c_0$ to $c_2$, and $d_0$ to $d_2$, are obtained, in reality.

Thereafter, when the number r of stages of extended keys is input (step S7), corresponding data are selected from the intermediate data which have been already prepared (step S8), whereby the selected data are transposed in accordance with the number r (step S9). Then, irreversible conversion G is applied to the intermediate data after the transposition (step S10) to output an extended key of the r-th stage (step S11).

In the case when another extended key is required to be prepared (step S12; YES), it shifts to the above described step S7, and the same processing is repeated, while preparing process of extended key is completed in the case when a preparation of required extended keys was finished (step S12; NO).

As described above, when the processing in the above steps S1 to S6 is carried out, the intermediate data of $a_i$ to $d_i$ wherein i=0, 1, and 2 can be prepared. Furthermore, when the processing in the steps S7 to S12 is implemented, extended keys to which have been applied irreversible conversion can be prepared at a high speed by the use of the intermediate data prepared in the steps S1 to S6.

Figure 3:
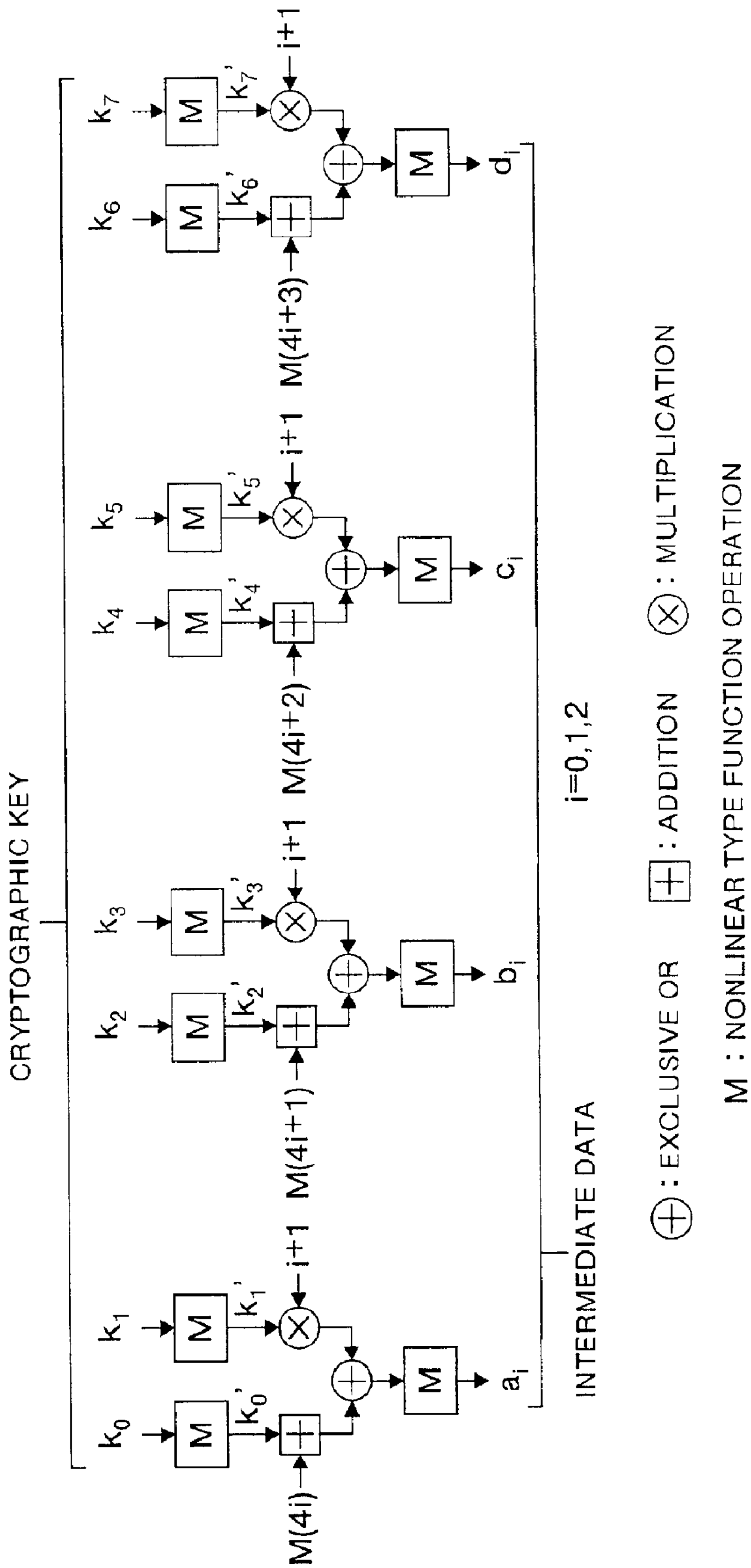
FIG. 3 is an explanatory diagram for explaining a concept for preparing intermediate data by means of the intermediate data preparing equipment shown in FIG. 1.

Next, a concept of preparing intermediate data by means of the intermediate data preparing equipment 4 shown in FIG. 1 will be described in more detail. In this connection, FIG. 3 is an explanatory diagram for explaining the concept of preparing intermediate data by means of the intermediate data preparing equipment 4 shown in FIG. 1. In FIG. 3, symbols "$k_0$ to $k_7$" designate binary digit strings which are obtained by dividing bit strings of a cryptographic key into eight groups, respectively, "M" is nonlinear type function operation, "+" means addition of a constant, "×" means multiplication of a constant, and symbols "$a_i$ to $d_i$" denote intermediate data.

As shown in FIG. 3, the intermediate data preparing equipment 4 divides binary digit strings of the cryptographic key into data $k_0$ to $k_7$ of eight groups. For instance, when the cryptographic key is composed of 128 (32×4) bits, the initial 32 bits correspond to $k_0$, the next 32 bits correspond to $k_1$, the following 32 bits are identified by $k_2$, and the further following 32 bits are identified as $k_3$ wherein there are the following relationships, i.e., $k_4=k_0$, $k_5=k_1$, $k_6=k_2$, and $k_7=k_3$, respectively. Thus, 32 bits each of data $k_0$ to $k_7$ are obtained.

Furthermore, when the cryptographic key is composed of 192 (32×6) bits, $k_0$ to $k_5$ are prepared wherein relationships $k_6=k_0$, and $k_7=k_1$ are established. Still further, when the cryptographic key is composed of 256 (32×8) bits, the cryptographic key is divided into 32 bits each to obtain 32 bits each of data $k_0$ to $k_7$. According to the manner described above, a cryptographic key may be divided into 32 bits each of data $k_0$ to $k_7$, even if the cryptographic key has any length of 128 bits, 192 bits or 256 bits.

Thus, as shown in FIG. 3, a nonlinear type function M is applied to the respective data of $k_0$ to $k_7$ to obtain 32 bit data of $k_0'$ to $k_7'$ corresponding respectively to the data $k_0$ to $k_7$. Then, a constant is added to even number-th data $k_0'$, $k_2'$, $k_4'$, and $k_6'$, respectively, while odd number-th data $k_1'$, $k_3'$, $k_5'$ and $k_7'$ are multiplied by the constant, respectively.

Thereafter, exclusive OR operation is subjected to a bit string of a even number-th data to which was added a constant (e.g., $k_0'$ +M(4i)) and an odd number-th bit string to which was multiplied by the constant (e.g., $k_1'$ ×(i+1)), respectively, and further the nonlinear type function M is applied to these operated results to prepare intermediate data $a_i$ to $d_i$.

It is to be noted herein that constants used in the above-described steps S4 to S6 are M(4i) and (i+1) as shown in FIG. 3 wherein i takes a value of 0, 1, or 2, whereby intermediate data $a_0$ to $a_2$, $b_0$ to $b_2$, $c_0$ to $c_2$, and $d_0$ to $d_2$ are obtained.

Next, a concept for preparing extended key from intermediate data by means of the extended key preparing equipment 5 shown in FIG. 1 will be described in more detail. In this connection, FIGS. 4(*a*) and 4(*b*) are explanatory diagrams each for explaining a concept for preparing extended key from intermediate data by the use of the extended key preparing equipment 5 shown in FIG. 1.

Figure 4:
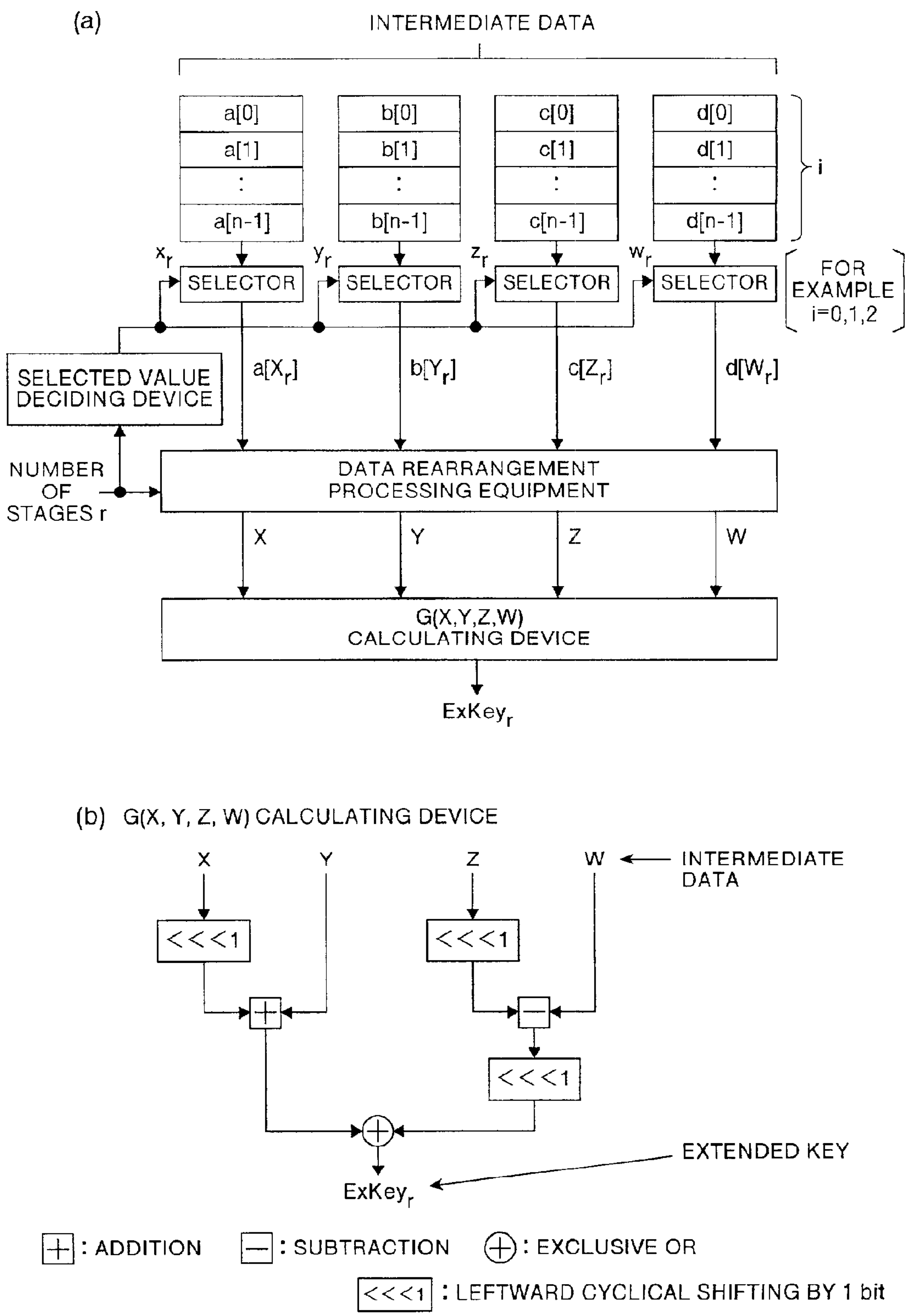
FIGS. 4(*a*) and 4(*b*) are explanatory diagrams each for explaining a concept for preparing an extended key from the intermediate data by means of the extended key preparing apparatus shown in FIG. 1.

As shown in FIG. 4(*a*), the extended key preparing equipment 5 is provided with a selector value deciding device, selectors, a data rearrangement processing device, and a G (X, Y, Z, W) calculating device. The selected value deciding device is a one for deciding xr, yr, zr, and wr indicating respective elements a, b, c, and d to be selected from among the respective intermediate data $a_i$, $b_i$, $c_i$, and $d_i$ (i=0, 1, or 2) based on the number of stages r of an extended key to be prepared.

A selector selects intermediate data $a(X_r)$ $b(Y_r)$, $c(Z_r)$, and $d(W_r)$, respectively, in accordance with the $x_r$, $y_r$, $z_r$, and $w_r$ decided by the selector value deciding device.

The data rearrangement processing device rearranges (transposes) the data $a(X_r)$, $b(Y_r)$, $c(Z_r)$, and $d(W_r)$ based on the number of stages r. More specifically, transpositions corresponding to the number of stages r are implemented as shown in FIG. 5(*c*), which will be described hereinafter.

The G(X, Y, Z, W, and r) calculating device prepares an extended key $E_x Key_r$ based on the data (X, Y, Z, and W) after the rearrangement. The construction of the G(X, Y, Z, W, and r) calculating device is as shown in FIG. 4(*b*). In the same figure, a representation "<<<1" means 1 bit leftward cyclical shifting for shifting bit string of data cyclically leftwards by 1 bit, "+" means addition of two data, "−" means for subtracting a certain data from another data, and "β" means exclusive OR.

In the following, procedure steps for preparing an extended key by means of the extended key preparing equipment 5 will be described. As shown in FIG. 4(*a*), when the number of stages r is input, the corresponding data are selected from among intermediate data, and the data selected are transposed in accordance with the number r. More specifically, one data is selected in every elements in such a manner that $a_1$ is selected from among $a_0$ to $a_2$, while $b_0$ is selected from among $b_0$ to $b_2$.

For instance, when "$a_1$, $b_0$, $c_1$, and $d_2$" are selected, they are transposed into "$b_0$, $a_1$, $d_2$, and $c_1$" wherein $X=b_0$, $Y=a_1$, $Z=d_2$, and $W=c_1$, respectively, in the case shown in FIG. 4.

Then, irreversible conversion is applied the irreversible conversion G to the intermediate data after the transposition thereof to output an extended key in the r-th stage. More specifically, the data X is sifted cyclically leftwards by 1 bit, it is added to the data Y, besides the data Z is shifted cyclically leftwards by 1 bit, and the data W is subtracted there from whereby it is cyclically shifted leftwards by 1 bit. Then, results of the both data were subjected to exclusive OR operation to produce the extended key r in the r-th stage.

Next, selection of data by means of the selected value deciding equipment as well as rearrangement of data by means of the data rearrangement processing equipment shown in FIG. 4(*a*) will be described in more detail. In this connection, FIGS. 5(*a*), 5(*b*), and 5(*c*) are explanatory diagrams for each explaining the selection of data by means of the selected value deciding equipment as well as the rearrangement of data by means of the data rearrangement processing equipment shown in FIG. 4(*a*).

FIG. 5(*a*) expresses equations (1), which is applied at the time when intermediate data to be selected is selected by the selected value deciding equipment, and they are as follows:

$$x_{r=zr=r} \bmod 3$$

$$y_r=w_r=r+[r/3] \bmod 3$$

as expressed in equations (1).

FIG. 5(*b*) is a diagram illustrating schematically the equations (1) shown in FIG. 5(*a*) wherein numerical values corresponding to that, which are to be selected from one of three numbers of 0, 1, and 2 are indicated in the case where the number of stages is r, and a group composed of nine numbers are cycled.

When a value corresponding to the number of stages r (one of three numbers i=0, 1, and 2) is decided in accordance with FIG. 5(*a*) or FIG. 5(*b*), ($X_r$, $Y_r$, $Z_r$, and $W_r$) corresponding to the number of stages r can be selected from the number i each of intermediate data shown in FIG. 4(*a*).

FIG. 5(*c*) shows an order table that is used in the case where rearrangement is implemented by means of the data rearrangement processing equipment. This order table functions to decide an order in the case where the intermediate data ($X_r$, $Y_r$, $Z_r$, and $W_r$) of the number of stages r selected in FIG. 5(*a*) or FIG. 5(*b*) are rearranged (replaced). More specifically, rearrangement is carried out in accordance with the order table wherein the number of stages r on the left side are allowed to correspond to orders for rearrangement on the right side in the figure.

For instance, when "$a_1$, $b_0$, $c_1$, and $d_2$" are selected, it becomes "$a_1$, $b_0$, $c_1$, and $d_2$" in the case where the number of stages is 0, it comes to be "$b_0$, $a_1$, $d_2$, and $c_1$" in the case where the number of stages is 1, and further it becomes "$d_2$, $c_1$, $b_0$, and $a_1$" in the case where the number of stages is 2.

Figure 6:
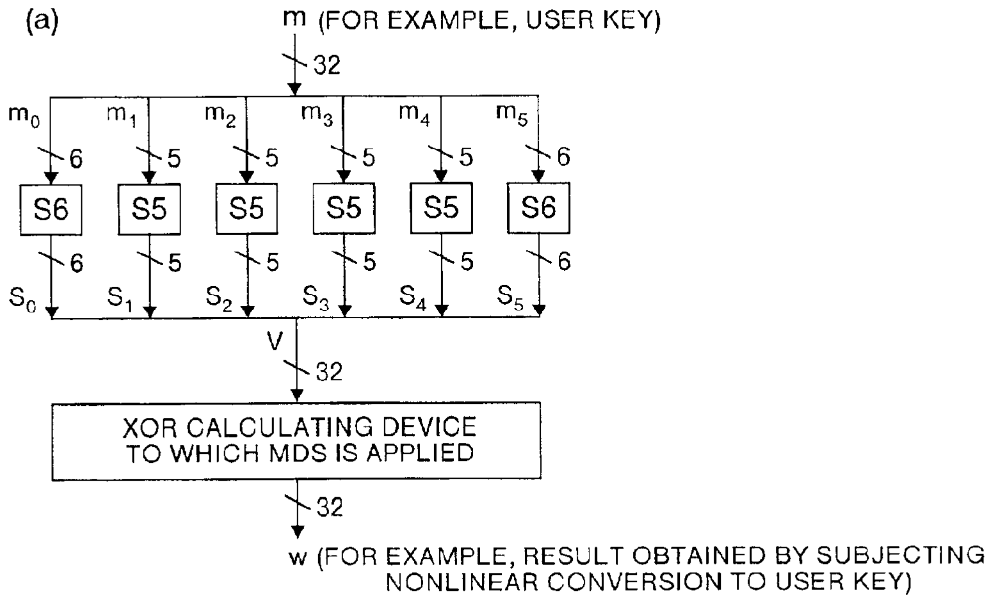
FIGS. 6(*a*), 6(*b*), and 6(*c*) are explanatory diagrams (No. 1) each for explaining an example of operations for a nonlinear type function conducted by the intermediate data preparing equipment shown in FIG. 1.

Next, an example of nonlinear type function operation performed by the intermediate data preparing equipment 4 shown in FIG. 1 will be described. It is to be noted that the present invention is not limited to this nonlinear type operation, but a variety of nonlinear type operations may also be applied. FIGS. 6(*a*), 6(*b*), and 6(*c*) as well as FIGS. 7(*d*) and 7(*e*) are explanatory diagrams for each explaining an example of nonlinear type function operation carried out by the intermediate data preparing equipment 4 shown in FIG. 1.

FIG. 6(*a*) illustrates an example of the whole construction of operation for the nonlinear type function M wherein a case where the nonlinear type function M is operated by applying a user key (cryptographic key) m of 32 bits to prepare a result w of 32 bits is shown.

As illustrated, a user key of 32 bits is divided herein into $m_0$, $m_1$, $m_2$, $m_3$, $m_4$, and $m_5$ of 6, 5, 5, 5, 5, and 6 bits, respectively. Then, values x are converted into those of S5 (x) as to $m_1$, $m_2$, $m_3$, and $m_4$ which are divided into 5 bits, respectively, in accordance with the table of S5 (x) shown in FIG. 6(*b*).

Likewise, values of x are converted into values of S6 (x) as to $m_0$, and $m_6$ divided in 6 bits, respectively, in accordance with S6 (x) shown in FIG. 6(*c*), whereby data v shown in FIG. 6(*a*) is prepared.

Figure 7:
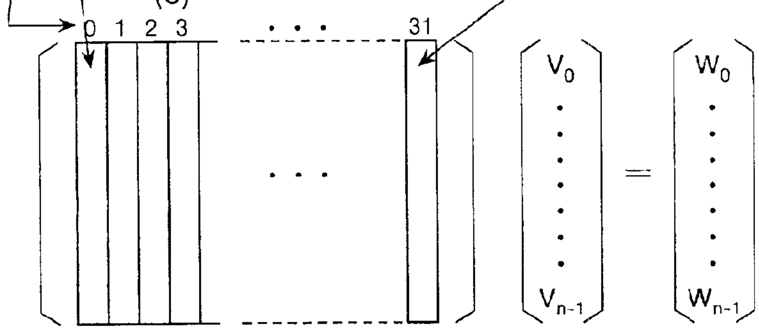
FIGS. 7(*d*) and 7(*e*) are explanatory diagrams (No. 2) each for explaining another example of operations for the nonlinear type function conducted by the intermediate data preparing equipment shown in FIG. 1.
Figure 8:
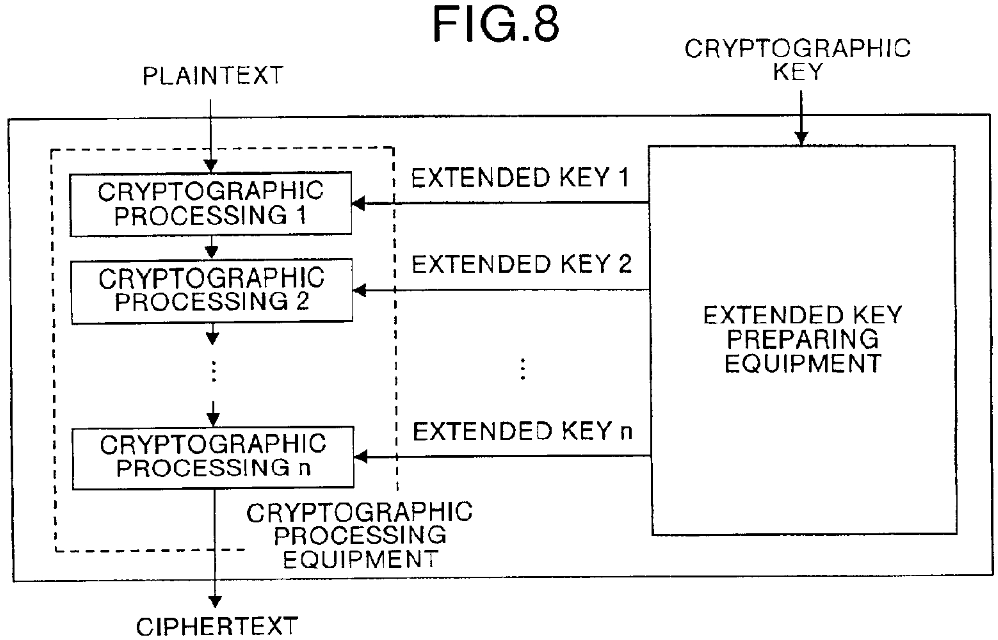
FIG. 8 is an explanatory diagram for explaining cryptographic processing by means of a usual common key cryptography.

Thereafter, values of MDS (x) shown in FIG. 7(*d*) are placed at respective positions of a determinant shown in FIG. 7(*e*), besides data v are also disposed in the determinant concerning the determinant shown in FIG. 7(*e*), and both the values are subjected to matrix computation to calculate values w. Thus, results (operation results of nonlinear type function M) by means of an XOR calculating device wherein the MDS of FIG. 6(*a*) is used are obtained.

Next, processing in the first stage for preparing intermediate data from a cryptographic key which has been already explained as well as processing in the second stage for preparing extended keys of the number of stages r assigned by the intermediate data will be described by the use of mathematical models and signs.

(1) Processing in the first stage (processing for preparing intermediate data from a cryptographic key):

(1-1) A cryptographic key of 256 bits is divided into eight data $k_0$, $k_1$, . . . , $k_7$ in every 32 bits (see FIG. 3).

(1-2) Intermediate data $a_i$, $b_i$, $c_i$, and $d_i$ (i=0, 1, 2) are prepared in accordance with calculations of the following paragraphs (1-3) to (1-6) by utilizing nonlinear type function M to which is input data of 32 bits that was divided in the paragraph (1-1), while which outputs the data of 32 bit (see FIG. 3). Furthermore, process steps (3-1) to (3-6) are executed with respect to the nonlinear type function M.

(1-3) $a_i$=M (Ta ($k_0$, i) XOR Ua ($k_1$, i) wherein Ta ($k_0$, i)=M ($k_0$)+M (4i), Ua ($k_1$, i)=M ($k_1$)×(i+1) is calculated. XOR represents an exclusive OR operation.

(1-4) $b_i$=M (Tb ($k_2$, i) XOR Ub ($k_3$, i) wherein Tb ($k_3$, i)=M ($k_2$)+M (4i+1), Ub ($k_3$, i)=M ($k_3$)×(i+1) is calculated.

(1-5) $c_i$=M (Tc ($k_4$, i) XOR Uc ($k_5$, i) wherein Tc ($k_4$, i)=M ($k_4$)+M (4i+2), Uc ($k_5$, i)=M ($k_5$)×(i+1) is calculated.

(1-6) $d_i$=M (Td ($k_6$, i) XOR Ud ($k_7$, 1)) wherein Td ($k_6$, i)=M ($k_6$)+M (4i+3), Ud ($k_7$, i)=M ($k_7$)×(i+1) is calculated.

(2) Processing in the second stage (processing for preparing extended keys of the number of stages r from intermediate data):

(2-1) Calculation is made with respect to extended keys $E_xKey_r$ of the number of stages r (r=0, 1, and 2) in accordance with the following paragraphs (2-2) to (2-4) (see FIG. 4(*a*)).

(2-2) A progression X, Y, Z, W represented by Xr=Zr=r mod 3, Yr=Wr=r+[r/3] mod 3 (Equation (1)) is used to obtain (X, Y, Z, W)=(a (Xr), b (Yr), c (Zr), d (Wr))

(2-3) Data rearrangement represented by (X, Y, Z, W)=ORDER__12 (X, Y, Z, W, r') wherein ORDER__12 (X, Y, Z, W, r') is the one shown in FIG. 5(*c*) is made with respect to r' satisfying r'=(r+[r/36]) mod 12.

(2-4) Extended keys of the number of stages r are calculated by means of $E_xKey_r$=G (X, Y, Z, W) wherein G (X, Y, Z, W)=((x<<<1)+Y) XOR (((Z<<<1)−W)<<<1), and <<<1 indicates 1 bit leftward cyclical shifting (see FIG. 4(*b*)).

(3) Operation processing of nonlinear type function M:

(3-1) In accordance with the following paragraphs (3-2) to (3-6), result w of 32 bits is output from input m of 32 bits (see FIG. 6(*a*)).

(3-2) The input m is bit-divided to acquire values $m_0, \ldots, m_5$ in the following forms:

$m_0$=(the 5th bit from the 0th bit of m)

$m_1$=(the 10th bit from the 6th bit of m)

$m_2$=(the 15th bit from the 11th bit of m)

$m_3$=(the 20th bit from the 16th bit of m)

$m_4$=(the 25th bit from the 21st bit of m)

$m_5$=(the 31st bit from the 26th bit of m)

(3-3) A nonlinear type transformation function $S_5$ which outputs 5 bits in respect of input of 5 bits as well as a nonlinear type conversion function $S_6$ which outputs 6 bits in respect of input of 6 bits wherein $S_5$ and $S_6$ are those shown in FIGS. 6(*b*) and 6(*c*), respectively, are used to acquire the following results:

$s_0=S_6$ ($m_0$)

$s_1=S_5$ ($m_1$)

$s_2=S_5$ ($m_2$)

$s_3=S_5$ ($m_3$)

$s_4=S_5$ ($m_4$)

$s_5=S_6$ ($m_5$)

(3-4) An equation v=s0|s1|s2|s3|s4|s5 wherein "|" represents link of bit values is calculated.

(3-5) An equation w=(v0×MDS (0)) XOR (v1×MDS (1)) XOR . . . XOR (v 31×MDS (31)) wherein vi×MDS (i) is 0 in case of vi=0, while it is MDS (i) in case of vi=1, by means of the conversion table MDS which is output 32 bits from the bit value vi that is the i-th v and the input of 5 bits, and MDS is the one shown in FIG. 7(*d*) is calculated.

(3-6) The system outputs w.

As mentioned above, the present embodiment is constructed in such that intermediate data $a_i$, $b_i$, $c_i$, and $d_i$ are prepared by the intermediate data preparing equipment 4 from a cryptographic key through a nonlinear type function operation and the like, the extended key preparing equipment 5 selects a [Xr], b [Yr], c [Zr], and d [Wr] corresponding to the number of stages r from the intermediate data, and rearranges the data as well as implements that of bit operation to prepare extended keys. As a result, safe extended keys can be prepared from a cryptographic key at a high speed.

More specifically, the present invention has such a construction in that intermediate data are prepared from a cryptographic key in the first stage, arbitrary data are selected from the intermediate data to effect irreversible conversion in the second stage, whereby extended keys of an arbitrary number of extended keys are prepared. Thus, it becomes possible to prepare the extended keys at a high speed through irreversible conversion, whereby safety in common key system can be elevated.

As a result, the present invention provides the following advantages.

(1) For instance, although a significant period of time is required for preparing one intermediate data, the number of intermediate data required can be reduced by the extended key preparing equipment 5, whereby extended keys each having high safety can be prepared at a high speed.

(2) In the case where only extended keys, which will be required are prepared on the course of processing for encryption or decryption without storing all of extended keys $E_xKey_0$, $E_xKey_1$, . . . , $E_xKey_{n-1}$ prepared, only the extended keys which correspond to the number of stages r assigned can be prepared at a high speed.

Figure 9:
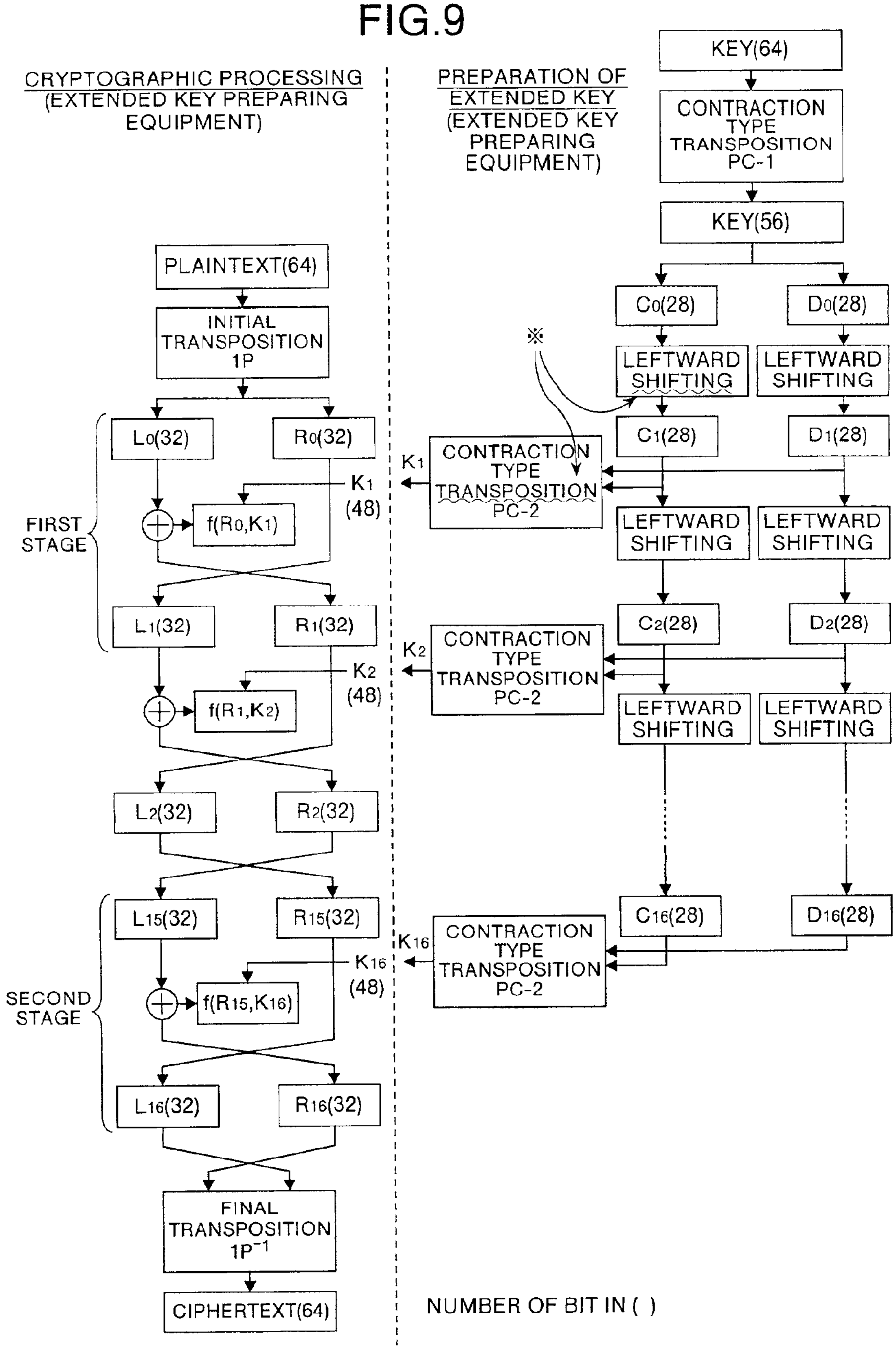
FIG. 9 is a block diagram illustrating a conventional algorithm based on DES cryptography.

Further explanation will be made in this respect, in a common key cryptosystem, in general, when extended keys are used in an order of $E_xKey_0$, $E_xKey_1$, . . . , $E_xKey_{n-1}$ in encryption, the extended keys are employed in the reverse order of that in the encryption in such order of $E_xKey_{n-1}$, . . . , $E_xKey_1$, $E_xKey_0$ in decryption. In this case, when successive preparation is made in accordance with an extended key preparing apparatus wherein a value of $E_xKey_0$ is required for preparing $E_xKey_1$, (see FIG. 9 mentioned already), $E_xKey_1$ cannot be directly prepared, but $E_xKey_0$ is previously prepared, and then $E_xKey_1$ is prepared by the use of the former $E_xKey_0$. Accordingly, a period of time for preparing an extended key in decryption is longer than that of the encryption by an amount corresponding to the time as explained above.

On the other hand, since extended keys can be prepared by assigning an arbitrary number of stages r independent from the other extended keys in the present embodiment, the same period of time is required in both of a case where extended keys are prepared in an order of $E_xKey_0$, $E_xKey_1$, . . . , $E_xKey_{n-1}$ and a case where extended keys are prepared in an order of $E_xKey_{n-1}$, . . . , $E_xKey_1$, $E_xKey_0$.

As described above, the present embodiment according to the invention exhibits such a remarkable advantage that even if extended keys are prepared successively, periods of time for processing encryption and decryption can make equal to each other, whereby an appearance of a longer period of time for preparing extended keys in decryption than that of encryption can be avoided.

While only the case where i=0, 1, and 2 has been described in the present embodiment for the convenience of explanation, the present invention is not limited thereto, but it is also applicable for the case where i is 3 or more. Furthermore, although an example of nonlinear type function operation has been described herein, the invention is not limited thereto, but other one way functions such as so-called hash function and the like are applicable.

As described above, according to the invention claimed in the first aspect, binary digit string of the cryptographic key is divided into a plurality of elements each composed of a predetermined bit length; a plurality of intermediate data are prepared by applying the plurality of times an operation wherein a predetermined constant is used to the respective elements; a plurality of intermediate data corresponding to the number of stages of extended keys are selected from the plurality of the intermediate data prepared; and the extended keys corresponding to the number of stages are prepared by converting irreversibly the plurality of the intermediate data selected, whereby there is an advantage to provide an extended key preparing apparatus by which such extended keys required in the case where common key cryptosystem is applied can be safely prepared at a high speed.

According to the invention claimed in the second aspect, nonlinear type operation is effected with respect to the respective elements divided, whereby there is an advantage to provide an extended key preparing apparatus by which bits forming a cryptographic key are diffused, so that safety in cryptograph can be much more increased.

According to the invention claimed in the third aspect, when the cryptographic key is divided into eight elements of 32 bits, the nonlinear type operating means separates the elements into 6, 5, 5, 5, 5, and 6 bits to transpose the same into other data, respectively, and the data after transposition are subjected to nonlinear type operation by the use of a determinant, whereby there is an advantage to provide an extended key preparing apparatus by which nonlinear type operation can be efficiently carried out at a high speed.

According to the invention claimed in the fourth aspect, a constant is added to an odd number-th element which has been subjected to nonlinear type operation; besides an even number-th element which has been subjected to nonlinear type operation is multiplied by the constant; and exclusive OR operation of both the odd number-th element and the even number-th element is effected, whereby there is an advantage to provide an extended key preparing apparatus by which intermediate data can be efficiently prepared.

According to the invention claimed in the fifth aspect, the result of the exclusive OR operation is subjected to nonlinear type operation to prepare intermediate data, whereby there is an advantage to provide an extended key preparing apparatus by which bits forming the result of the exclusive OR operation are further diffused, so that safety in cryptograph can be much more improved.

According to the invention claimed in the sixth aspect, the plurality of times of additions and multiplications are repeated with the use of the number i of different constants, respectively, to prepare the number i of data in every elements; i times of operations for acquiring exclusive OR of the odd number-th element and the even number-th element which have been operated by the use of the same constants are repeated; and the number i of intermediate data are prepared in every elements, whereby there is an advantage to provide an extended key preparing apparatus by which a plurality of intermediate data can be prepared in every respective elements by a simple procedure.

According to the invention claimed in the seventh aspect, one intermediate data corresponding to the number of stages of an extended key is selected among the number i of intermediate data contained in the respective elements prepared, whereby there is an advantage to provide an extended key preparing apparatus by which independency of a certain extended key can be maintained with respect to the other keys.

According to the invention claimed in the eighth aspect, a plurality of intermediate data selected are rearranged; and the plurality of intermediate data which have been rearranged are converted irreversibly, whereby there is an advantage to provide an extended key preparing apparatus by which unidirectional property of a certain cryptographic key towards extended keys can be maintained, so that even if a certain extended key leaks out, the cryptographic key can be held in secret.

According to the invention claimed in the ninth aspect, when intermediate data are rearranged in an order of elements X, Y, Z, and W by the rearrangement means, a first data is prepared by adding the element Y to a data obtained by shifting cyclically the element X leftwards by 1 bit; a second data is prepared by sifting cyclically the data leftwards by further 1 bit, which data has been obtained by subtracting the element W from a data obtained by shifting cyclically the element Z leftwards by 1 bit; and exclusive OR of the first data and the second data is operated, whereby there is an advantage to provide an extended key preparing apparatus by which irreversible conversion can be efficiently implemented at a high speed.

According to the invention claimed in the tenth aspect, a cryptographic key of 128 bits, 192 bits, or 256 bits is divided into eight elements of 32 bits, whereby there is an advantage to provide an extended key preparing apparatus by which the extended key can be prepared by using the same logic, even if the number of bits input differs in extended key.

According to the invention claimed in the eleventh aspect, binary digit string of the cryptographic key is divided into a plurality of elements each composed of a predetermined bit length; a plurality of intermediate data are prepared by applying the plurality of times an operation wherein a predetermined constant is used to the respective elements; a plurality of intermediate data corresponding to the number of stages of extended keys are selected from the plurality of the intermediate data prepared; and the extended keys corresponding to the number of stages are prepared by converting irreversibly the plurality of the intermediate data selected, whereby there is an advantage to provide an extended key preparing method by which such extended keys required in the case where common key cryptosystem is applied can be safely prepared at a high speed.

According to the invention claimed in the twelfth aspect, nonlinear type operation is effected with respect to the respective elements divided, whereby there is an advantage to provide an extended key preparing method by which bits forming a cryptographic key are diffused, so that safety in cryptograph can be much more increased.

According to the invention claimed in the thirteenth aspect, when the cryptographic key is divided into eight elements of 32 bits, the nonlinear type operating means separates the elements into 6, 5, 5, 5, 5, and 6 bits to transpose the same into other data, respectively, and the data after transposition are subjected to nonlinear type operation by the use of a determinant, whereby there is an advantage to provide an extended key preparing method by which nonlinear type operation can be efficiently carried out at a high speed.

According to the invention claimed in the fourteenth aspect, a constant is added to an odd number-th element which has been subjected to nonlinear type operation; besides an even number-th element which has been subjected to nonlinear type operation is multiplied by the constant; and exclusive OR operation of both the odd number-th element and the even number-th element is effected, whereby there is an advantage to provide an extended key preparing method by which intermediate data can be efficiently prepared.

According to the invention claimed in the fifteenth aspect, the result of the exclusive OR operation is subjected to nonlinear type operation to prepare intermediate data, whereby there is an advantage to provide an extended key preparing method by which bits forming the result of the exclusive OR operation are further diffused, so that safety in cryptograph can be much more improved.

According to the invention claimed in the sixteenth aspect, the plurality of times of additions and multiplications are repeated with the use of the number i of different constants, respectively, to prepare the number i of data in every elements; i times of operations for acquiring exclusive OR of the odd number-th element and the even number-th element which have been operated by the use of the same constants are repeated; and the number i of intermediate data are prepared in every elements, whereby there is an advantage to provide an extended key preparing method by which a plurality of intermediate data can be prepared in every respective elements by a simple procedure.

According to the invention claimed in the seventeenth aspect, one intermediate data corresponding to the number of stages of an extended key is selected among the number i of intermediate data contained in the respective elements prepared, whereby there is an advantage to provide an extended key preparing method by which independency of a certain extended key can be maintained with respect to the other keys.

According to the invention claimed in the eighteenth aspect, a plurality of intermediate data selected are rearranged; and the plurality of intermediate data which have been rearranged are converted irreversibly, whereby there is an advantage to provide an extended key preparing method by which unidirectional property of a certain cryptographic key towards extended keys can be maintained, so that even if a certain extended key leaks out, the cryptographic key can be held in secret.

According to the invention claimed in the nineteenth aspect, when intermediate data are rearranged in an order of elements X, Y, Z, and W by the rearrangement means, a first data is prepared by adding the element Y to a data obtained by shifting cyclically the element X leftwards by 1 bit; a second data is prepared by sifting cyclically the data leftwards by further 1 bit, which data has been obtained by subtracting the element W from a data obtained by shifting cyclically the element Z leftwards by 1 bit; and exclusive OR of the first data and the second data is operated, whereby there is an advantage to provide an extended key preparing method by which irreversible conversion can be efficiently implemented at a high speed.

According to the invention claimed in the twentieth aspect, a cryptographic key of 128 bits, 192 bits, or 256 bits is divided into eight elements of 32 bits, whereby there is an advantage to provide an extended key preparing method by which the extended key can be prepared by using the same logic, even if the number of bits input differs in extended key.

According to the invention claimed the twenty-first aspect, binary digit string of the cryptographic key is divided into a plurality of elements each composed of a predetermined bit length; a plurality of intermediate data are prepared by applying the plurality of times an operation wherein a predetermined constant is used to the respective elements; a plurality of intermediate data corresponding to the number of stages of extended keys are selected from the plurality of the intermediate data prepared; and the extended keys corresponding to the number of stages are prepared by converting irreversibly the plurality of the intermediate data selected, whereby there is an advantage to provide a computer readable recording medium by which such extended keys required in the case where common key cryptosystem is applied can be safely prepared at a high speed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An extended key preparing apparatus wherein extended keys are prepared in common key cryptosystem from a cryptographic key input, comprising:

a dividing unit which divides a bit string of said cryptographic key into a plurality of bit groups, each bit group having a predetermined bit length;

an intermediate data preparing unit which prepares a plurality of intermediate data groups from the bit groups by a predetermined operation with different constant for each bit group, each intermediate data group having first intermediate data;

a selecting unit which selects one item of the first intermediate data for each of the intermediate data groups depending on a number of stages of extended keys to determine second intermediate data; and an extended key preparing unit which prepares the extended keys having a bit length longer than the bit string of said cryptographic key by converting irreversibly the second intermediate data, wherein said intermediate data preparing unit is provided with a nonlinear type operating unit for effecting a nonlinear type operation with respect to each bit group to prepare the intermediate data groups.

2. An extended key preparing apparatus according to claim 1, wherein said dividing unit divides the bit string of said cryptographic key into eight of the bit groups, the predetermined bit length is 32 bits, and said nonlinear type operating unit separates each bit group into 6, 5, 5, 5, 5, and 6 bits to transpose the same into other data, respectively, and the data after transposition are subjected to nonlinear type operation by the use of a determinant.

3. An extended key preparing apparatus according to claim 1, wherein said intermediate data preparing unit is provided with:

an addition unit which adds a first constant to an even-numbered bit group that has been subjected to the nonlinear type operation to obtain a first result;

a multiplication unit which multiplies by a second constant an odd-numbered bit group which has been subjected to the nonlinear type operation to obtain a second result, wherein the odd number is the even number plus one; and an exclusive OR operating unit which effects exclusive OR operation of the first result and the second result.

4. An extended key preparing apparatus according to claim 3, comprising further a preparing unit for preparing the intermediate data group by nonlinearly operating on a result of said exclusive OR operation.

5. An extended key preparing apparatus according to claim 4, wherein said addition unit and said multiplication unit repeat a plurality of times additions and multiplications by the use of the number i of different constants, respectively, to prepare the number i of data in every bit group; said exclusive OR operating unit repeats i times operations for acquiring exclusive OR of the even-numbered bit group and the odd-numbered bit group which have been operated by the use of the same constants; and said preparing unit prepare the number i of items of the first intermediate data in every bit group.

6. An extended key preparing apparatus according to claim 5, wherein said selecting unit selects one item of the first intermediate data corresponding to said number of stages of an extended key among the number i of items of the first intermediate data contained in the respective intermediate data groups which have been prepared by said intermediate data preparing unit.

7. An extended key preparing apparatus according to claim 1, wherein said extended key preparing unit is provided with:

a rearrangement unit which rearranges the second intermediate data to obtain a rearranged intermediate data; and an irreversible conversion unit which converts irreversibly the rearranged intermediate data.

8. An extended key preparing apparatus according to claim 7, wherein the second intermediate data includes four items represented by four elements X, Y, Z, and W, respectively, said rearrangement unit rearranges the four items, and said irreversible converting unit prepares a first data by adding the element Y to a data obtained by shifting cyclically the element X leftwards by 1 bit; prepares a second data determined by sifting cyclically the data leftwards by further 1 bit, which data has been obtained by subtracting the element W from a data obtained by shifting cyclically the element Z leftwards by 1 bit; and performs an exclusive OR operation on said first data and said second data.

9. An extended key preparing apparatus according to claim 1, wherein said dividing unit divides a cryptographic key of 128 bits, 192 bits, or 256 bits into eight groups of 32 bits.

10. An extended key preparing method wherein extended keys are prepared in common key cryptosystem from a cryptographic key input, comprising:

dividing a bit string of said cryptographic key into a plurality of bit groups, each bit group having a predetermined bit length;

preparing a plurality of intermediate data groups from the bit groups by effecting a nonlinear type operation with different constant for each bit group, each intermediate data group having a first intermediate data;

selecting one item of the first intermediate data for each of the intermediate data groups depending on a number of stages of extended keys to determine second intermediate data; and preparing the extended keys having a bit length longer than the bit string of said cryptographic key by converting irreversibly the second intermediate data.

11. An extended key preparing method according to claim 10, wherein said dividing includes dividing the bit string of said cryptographic key into eight of the bit groups, the predetermined bit length is 32 bits, and said effecting of the nonlinear type operation includes separating each bit group into 6, 5, 5, 5, 5, and 6 bits to transpose the same into other data, respectively, and the data after transposition are subjected to a nonlinear type operation by the use of a determinant.

12. An extended key preparing method according to claim 10, wherein said preparing of the plurality of intermediate data groups includes adding a first constant to an even-numbered bit group that has been subjected to the nonlinear type operation to obtain a first result;

multiplying by a second constant an odd-numbered bit group which has been subjected to the nonlinear type operation to obtain a second result, wherein the odd number is the even number plus one; and effecting an exclusive OR operation of the first result and the second result.

13. An extended key preparing method according to claim 12, further comprising preparing the intermediate data group by nonlinearly operating on a result of said exclusive OR operation.

14. An extended key preparing method according to claim 13, wherein said adding and said multiplying includes repeating a plurality of times additions and multiplications by the use of the number i of different constants, respectively, to prepare the number i of data in every bit group; said effecting of the exclusive OR operation includes repeating i times operations for acquiring exclusive OR of the even-numbered bit group and the odd-numbered bit group which have been operated by the use of the same constants; and said preparing of the intermediate data group by nonlinearly operating includes preparing the number i of intermediate data in every bit group.

15. An extended key preparing method according to claim 14, wherein said selecting includes selecting one item of the first intermediate data corresponding to said number of stages of an extended key among the number i of items of the first intermediate data contained in the respective intermediate data groups which have been prepared by said intermediate data preparing step.

16. An extended key preparing method according to claim 10, wherein said preparing of the extended keys includes rearranging the second intermediate data to obtain a rearranged intermediate data; and converting irreversibly the rearranged intermediate data.

17. An extended key preparing method according to claim 16, wherein the second intermediate data includes four items represented by four elements X, Y, Z, and W, respectively, said rearranging includes rearranging the four items, and said converting includes preparing a first data by adding the element Y to a data obtained by shifting cyclically the element X leftwards by 1 bit; prepares a second data determined by sifting cyclically the data leftwards by further 1 bit, which data has been obtained by subtracting the element W from a data obtained by shifting cyclically the element Z leftwards by 1 bit; and performing an exclusive OR operation on said first data and said second data.

18. An extended key preparing method according to claim 10, wherein said dividing step divides a cryptographic key of 128 bits, 192 bits, or 256 bits into eight groups of 32 bits.

19. A computer readable recording medium wherein an extended key preparing program in which extended keys are prepared in common key cryptosystem from a cryptographic key input is to be recorded, the program comprising program code means which when executed perform:

dividing a bit string of said cryptographic key into a plurality of bit groups, each bit group having a predetermined bit length;

preparing a plurality of intermediate data groups from the bit groups by effecting a nonlinear type operation with different constant for each bit group, each intermediate data group having a first intermediate data;

one item of the first intermediate data for each of the intermediate data groups depending on a number of stages of extended keys to determine second intermediate data; and preparing the extended keys having a bit length longer than the bit string of said cryptographic key by converting irreversibly the second intermediate data.

20. An extended key preparing program in which extended keys are prepared in common key cryptosystem from a cryptographic key input, the program comprising program code means which when executed perform:

dividing a bit string of said cryptographic key into a plurality of bit groups, each bit group having a predetermined bit length;

preparing a plurality of intermediate data groups from the bit group by effecting a nonlinear type operation with different constant for each bit group, each intermediate data group having first intermediate data;

one item of the intermediate data for each of the intermediate data groups depending on a number of stages of extended keys to determine second intermediate data; and preparing the extended keys having a bit length longer than the bit string of said cryptographic key by converting irreversibly the second intermediate data.

21. An extended key preparing apparatus wherein extended keys are prepared in common key cryptosystem from a cryptographic key input, comprising:

a dividing unit which divides binary digit string of said cryptographic key into a plurality of elements each composed of a predetermined bit length;

an intermediate data preparing unit which prepares a plurality of intermediate data by applying a plurality of times an operation wherein a predetermined constant is used to the respective elements divided by said dividing unit, said intermediate data preparing unit being provided with a nonlinear type operating unit for effecting nonlinear type operation with respect to the respective elements divided by said dividing unit, said nonlinear type operating unit performing nonlinear type operation in such a manner that when said cryptographic key is divided into eight elements of 32 bits by said dividing unit, said nonlinear type operating unit separates said elements into 6, 5, 5, 5, 5, and 6 bits to transpose the same into other data, respectively, and the data after transposition are subjected to nonlinear type operation by the use of a determinant a selecting unit which selects a plurality of intermediate data corresponding to the number of stages of extended keys from the plurality of the intermediate data prepared by said intermediate data preparing unit; and an extended key preparing unit which prepares the extended keys corresponding to said number of stages by converting irreversibly the plurality of the intermediate data selected by said selecting unit.

22. An extended key preparing method wherein extended keys are prepared in common key cryptosystem from a cryptographic key input, comprising the steps of, dividing binary digit string of said cryptographic key into a plurality of elements each composed of a predetermined bit length;

preparing a plurality of intermediate data by applying the plurality of times an operation wherein a predetermined constant is used to the respective elements divided by said dividing step, said preparing involving a nonlinear type operating step for effecting nonlinear type operation with respect to the respective elements divided by said dividing step, said nonlinear type operating step performing a nonlinear type operation in such a manner that when said cryptographic key is divided into eight elements of 32 bits by said dividing step, said nonlinear type operating step separates said elements into 6, 5, 5, 5, 5, and 6 bits to transpose the same into other data, respectively, and the data after transposition are subjected to nonlinear type operation by the use of a determinant;

selecting a plurality of intermediate data corresponding to the number of stages of extended keys from the plurality of the intermediate data prepared by said intermediate data preparing step; and preparing the extended keys corresponding to said number of stages by converting irreversibly the plurality of the intermediate data selected by said selecting step.

* * * * *

UNITED STATES PATENT AND TRADEMARK OFFICE

CERTIFICATE OF CORRECTION

PATENT NO. : 6,956,951 B2
APPLICATION NO. : 09/811551
DATED : October 18, 2005
INVENTOR(S) : Takeshi Shimoyama et al.

It is certified that error appears in the above-identified patent and that said Letters Patent is hereby corrected as shown below:

Claim 20, column 17, line 5, before “one” insert --selecting--

Signed and Sealed this

Fifteenth Day of August, 2006

JON W. DUDAS
*Director of the United States Patent and Trademark Office*